US007273996B2

(12) United States Patent
Marriott et al.

(10) Patent No.: US 7,273,996 B2
(45) Date of Patent: Sep. 25, 2007

(54) INDUCTIVELY COUPLED PLASMA ALIGNMENT APPARATUS AND METHOD

(75) Inventors: Philip Marriott, Macclesfield (GB); Jonathan Herbert Bradford, Bolton (GB); Jim Stringer, Sandbach (GB); Timothy Alan Whitechurch, Natwich (GB)

(73) Assignee: Thermo Fisher Scientific Inc., Waltham, MA (US)

( * ) Notice: Subject to any disclaimer, the term of this patent is extended or adjusted under 35 U.S.C. 154(b) by 0 days.

(21) Appl. No.: 11/293,336

(22) Filed: Dec. 1, 2005

(65) Prior Publication Data

US 2007/0045247 A1 Mar. 1, 2007

(30) Foreign Application Priority Data

Aug. 10, 2005 (GB) ................................ 0516451.2

(51) Int. Cl.
*B23K 9/00* (2006.01)

(52) U.S. Cl. ............................ 219/121.52; 219/121.51

(58) Field of Classification Search ........... 219/121.52, 219/121.51, 121.5, 121.48, 121.54, 121.59, 219/121.36, 121.47; 356/316, 328, 330; 315/111.51, 111.21; 313/231.31; 250/288, 250/281, 282

See application file for complete search history.

(56) References Cited

U.S. PATENT DOCUMENTS 4,266,113 A * 5/1981 Denton et al. ......... 219/121.51
4,293,220 A * 10/1981 Denton et al. .............. 356/316
4,551,609 A 11/1985 Falk
4,682,026 A 7/1987 Douglas
4,766,287 A * 8/1988 Morrisroe et al. ..... 219/121.52
5,185,523 A 2/1993 Kitagawa et al.
5,334,834 A 8/1994 Ito et al.
2002/0100751 A1 8/2002 Carr
2004/0195218 A1 10/2004 Hiroaki et al.

FOREIGN PATENT DOCUMENTS

| | | |
|---|---|---|
| EP | 0 910 231 A | 4/1999 |
| GB | 968 472 A | 9/1964 |
| JP | 02227653 | 9/1990 |

* cited by examiner

*Primary Examiner*—Quang Van
(74) *Attorney, Agent, or Firm*—Charles B. Katz; David E. Allred

(57) ABSTRACT

An inductively coupled plasma alignment apparatus having a coil 10 for generating an inductively coupled plasma in a gas, the coil having a first axis 100; a torch 20 passing at least partially through the coil, the torch having a second axis 200; and an adjustment mechanism 80, 110 for adjusting the position of the torch with respect to the coil so as to alter the relative configuration of the first and second axes. The adjustment mechanism may adjust an angle and/or a distance between the second axis and the first axis. The second axis may be held substantially parallel to the first axis, while the adjustment mechanism adjusts a distance between the second axis and the first axis. The coil is preferably maintained substantially fixed in position with respect to a sampling aperture for sampling photons or ions from the plasma.

22 Claims, 8 Drawing Sheets

INDUCTIVELY COUPLED PLASMA ALIGNMENT APPARATUS AND METHOD

TECHNICAL FIELD

This invention relates to an inductively coupled plasma alignment apparatus, and in particular to alignment of the plasma generated within inductively coupled plasma torches in relation to sampling devices, either for sampling light emitted by the plasma, or for sampling ions created within the plasma.

BACKGROUND

Inductively coupled plasmas are well known as sources to excite and/or ionise sample material in order to analyse the composition of a sample by mass spectrometry (ICP-MS) or optical emission spectrometry (ICP-OES).

U.S. Pat. Nos. 4,682,026 and 4,551,609 show typical inductively coupled plasma sources. A plasma is formed in a gas by the use of a RF current driven in a coil. The gas is confined in a torch that passes through the coil. Sample material is introduced into the plasma through an inner tube in the torch, the material being carried by a stream of carrier gas.

Ions or photons from the plasma are sampled through an aperture in a sampling plate or sampling cone. To be able to detect very low concentrations of analyte species, the aperture should be well aligned with that part of the plasma containing the highest proportion of ionised or excited analyte species. In prior art plasma sources, alignment is achieved by moving the RF electronics, the coil they are attached to, and the torch, with respect to the aperture. An example of this type of stage system for moving a source is given in U.S. Pat. No. 5,185,523 for a microwave induced plasma, in which the magnetron and the microwave power source are mounted onto a stage.

This prior art method has associated problems in that the electronics are bulky and heavy. Typically to move the heavy electronics, motion systems have been placed beneath the electronics enclosure, coil and torch, so as to avoid the use of cantilevers. They are then difficult to access for maintenance, and prone to contact with acidic sample solutions if spillages occur. Such motion systems are also relatively costly. To minimise stray RF emissions from the source, which can adversely affect other instrumentation, carefully placed, secure electrical earths are required. Such earths are more complex and less reliable when the components to be earthed must move. It also is desirable to fix the coil to the electronics as there must be a good degree of impedance matching for efficient transfer of up to 2 kW of power into the plasma. In some prior art alignment systems the electronics have been fixed with respect to the sampling aperture and adjustment effected by moving the coil and torch, but this approach requires a wider range of impedance matching, is less reliable and is costly.

In view of the foregoing discussion, there is a need for an improved inductively coupled plasma alignment apparatus.

SUMMARY OF THE INVENTION

According to a first aspect of the present invention there is provided an inductively coupled plasma alignment apparatus comprising: a coil for generating an inductively coupled plasma in a gas, the coil having a first axis; a torch passing at least partially through the coil, the torch having a second axis; and an adjustment mechanism for adjusting the position of the torch with respect to the coil so as to alter the relative configuration of the first and second axes.

According to a second aspect of the present invention, there is provided an inductively coupled plasma source assembly comprising: a coil for generating an inductively coupled plasma in a gas, the coil having a first axis; a torch passing at least partially through the coil, the torch having a second axis; and an adjustment mechanism for adjusting the position of the torch with respect to the coil so as to alter the relative configuration of the first and second axes.

By these aspects of the invention, substantially independent motions of the torch may be produced within the coil, while the coil is held stationary. It is possible for only the mass of the torch and part of the adjustment mechanism to be displaced. It is not therefore necessary to move relatively bulky and heavy electronics, allowing a simpler and lower-cost alignment mechanism to be used.

Electronics may be fixed with respect to the sampling aperture and also may be firmly connected to the sampling aperture and earthed, thereby reducing RF emissions. In the latter case, the coil does not move with respect to the electronics and can be connected securely to the output of those electronics, thereby reducing the range of adjustment needed for impedance matching.

The torch adjustment mechanism may be made such that it is light and arranged to move only the relatively light torch. Then, the torch adjustment mechanism can be oriented so as to avoid contact with acidic solutions that may result from sample spillages, and so as to be easily accessible for maintenance.

In one embodiment the alignment mechanism is arranged to adjust an angle between the second axis and the first axis.

In another embodiment, the alignment mechanism is arranged to adjust a distance between the second axis and the first axis.

In another embodiment, the alignment mechanism is arranged to adjust an angle between the second axis and the first axis and to adjust a distance between the second axis and the first axis.

In another embodiment, the second axis is held substantially parallel to the first axis, and the alignment mechanism is arranged to adjust a distance between the second axis and the first axis.

In another embodiment, the coil is maintained substantially fixed in position with respect to a sampling aperture for sampling photons or ions from the plasma.

In any of these preceding embodiments, the first axis can extend longitudinally through the coil, and further, the second axis can extend longitudinally through the torch.

In any of the preceding embodiments, an inductively coupled plasma source can comprise the alignment apparatus, or an inductively coupled plasma spectrometer can comprise the alignment apparatus.

According to a third aspect of the present invention there is provided a method of aligning an inductively coupled plasma to a sampling aperture by adjusting a position of a torch in which at least part of the plasma is generated, with respect to a plasma generating coil which surrounds at least a portion of the torch.

There is also provided a method of aligning an inductively coupled plasma to a sampling aperture wherein an angle between an axis of the torch and an axis of the coil is adjusted.

There is also provided a method of aligning an inductively coupled plasma to a sampling aperture wherein a separation between an axis of the torch and an axis of the coil is adjusted.

There is also provided a method of aligning an inductively coupled plasma to a sampling aperture wherein both an angle and a separation between an axis of the torch and an axis of the coil are adjusted.

There is further provided a method of aligning an inductively coupled plasma to a sampling aperture wherein an axis of the torch is maintained substantially parallel to an axis of the coil whilst the axis of the torch is moved with respect to the axis of the coil.

There is also provided a method of aligning an inductively coupled plasma to a sampling aperture wherein the coil is held stationary with respect to the sampling aperture and the torch is moved within the coil.

Other preferred features are set out in the accompanying description and in the claims which are appended thereto.

DESCRIPTION OF THE DRAWINGS

The present invention may be put into practice in a number of ways and some embodiments will now be described, by way of example only, with reference to the accompanying drawings in which:

FIG. 9 shows the effect of pivoting a torch about a pivot that is in a plane that passes through the center of the coil. FIG. 10 shows the effect of pivoting a torch about a pivot that lies in a plane remote from the coil.

Like reference numerals refer to corresponding parts throughout the several views of the drawings.

SPECIFIC DESCRIPTION

This invention has been developed from the discovery that the torch can be moved within a coil that is fixed in relation to a sampling aperture, without that motion having a significant detrimental effect upon the analytical results of the complete plasma source and spectrometer.

An inductively coupled plasma is inhomogeneous. It is well known that different regions within the plasma are, under equilibrium conditions, at different temperatures; see for example T. Hasegawa, M. Umemoto, H. Haraguchi, C. Hsiech and A. Montaser, Chapter 8, Fundamental Properties of Inductively Coupled Plasmas, in "Inductively Coupled Plasma in Analytical Atomic Spectrometry", 2$^{nd}$ Edition, Wiley-VCH.

Figure 1:
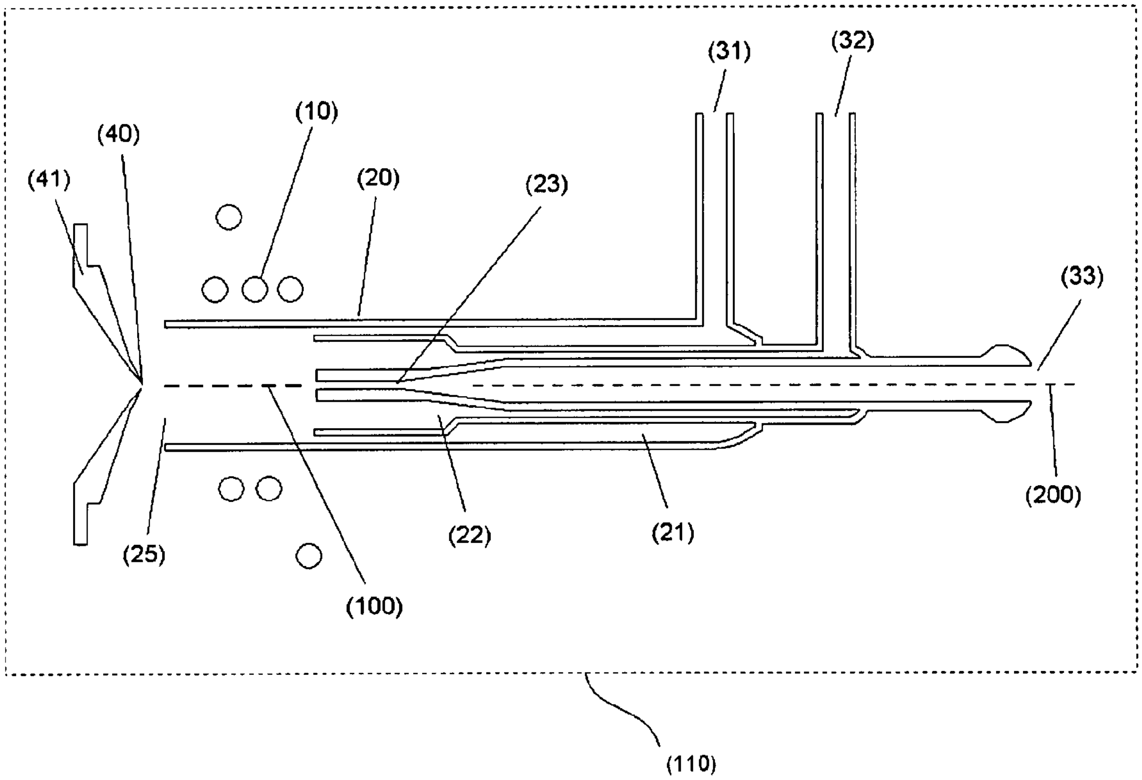
FIG. 1 shows a sectional view of the coil, torch and sampling plate for a typical ICP-MS system.

Referring now to FIG. 1 in which is shown a section through a torch (20), sampling plate (41) and coil (10). At a location close to the outlet (25) of the torch, the plasma has a "doughnut" or annular structure. This location is where, in ICP-MS for example, the plasma is sampled by the aperture (40). Due to the annular structure, the axial region is at a considerably lower temperature than the plasma further from the axis. The temperature variation is due to a combination of two effects. These are the induced oscillating current in the plasma, which is not on the axis but is around it; and the cooling effect of the gas that carries the sample droplets or particles. Due to the first of these effects, as the induced oscillating current in the plasma is generated by the action of an oscillating magnetic field, and this magnetic field is generated by the oscillating RF current in the coil, the current in the plasma would be expected to be fixed in relation to the coil.

That the torch can be moved within a coil that is fixed in relation to a sampling aperture, without it having a significant detrimental effect upon the analytical results of the complete ion source and spectrometer was surprising, as whilst motion of the torch within the coil affects where the stream of fine sample droplets or particles enters the plasma, it does not affect where the oscillating induced current flows in the plasma. It was therefore expected that moving the torch within the coil would change the position in the plasma at which the sample was introduced. The sample would thereby enter plasma that was at a different temperature. The temperature of the plasma is very important for the excitation and ionisation of the sample material. The inductively coupled plasma acts as an excellent ionisation source for fine droplets or particles injected into the core of the plasma. This ionisation source is sufficiently energetic so that most molecules are atomised, and most atoms across the periodic table are ionised, despite the wide range of ionisation potentials they possess. Yet the source is not so energetic that a wide range of multiply ionised species is created. It is undesirable to generate multiply ionised species, because mass spectrometers, for example, separate charged particles on the basis of mass-to-charge ratios. Hence, singly ionised mass 40 appears at the same place on the spectrum as doubly ionised mass 80, for example. The presence of multiply charged ions greatly complicates the mass spectrum and is highly undesirable. It also complicates the optical emission spectrum due to the formation of emission lines related to the multiply charged species formed.

If sample material enters a portion of the plasma that is at a different temperature, it was expected that this would alter the ionisation of the sample constituents. Moving the torch within the coil was therefore expected to lead to differences in the ionisation of the sample constituents. In particular, it was expected to affect the proportion of singly charged ions to doubly charged ions; the signal intensities of atomic species with high ionisation potential, relative to those with low ionisation potential; and the level of molecular ions sampled from the plasma. Changes to any of these could adversely affect the performance of the instrument, and would typically reduce its ability to detect the lowest concentration of analytes in the sample. Such degradation in performance would obviously be very undesirable.

Having moved the torch with respect to the coil, if such undesirable effects occurred, the present inventors believed that the original performance of the plasma ion source might be recovered by changing the power of the plasma. By this method, the temperature of the plasma at the position that the sample spray is introduced can, in principle, be varied.

Figure 2:
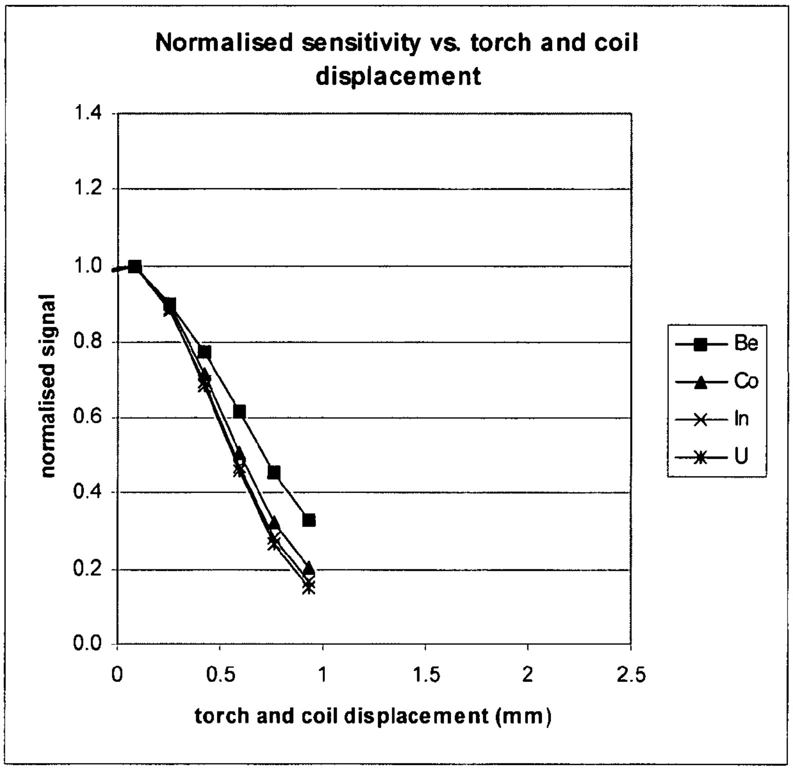
FIG. 2 shows the variation in signal of several typical analyte species measured by an ICP-MS, as the combination of torch and coil are together misaligned with respect to the sampling aperture.

To determine if such results did occur, and to see if recovery could be achieved by altering the plasma power, the analytical performance of an ICP-MS was tested, whilst moving the torch within the coil. In the experiment, both the coil and torch were first shifted together in relation to the sampling aperture to deliberately misalign the plasma with respect to the sampling aperture. This caused, as expected, a drop in analytical performance. In particular, the sensitivity of analytes across the mass range fell, as shown in FIG. 2, and the ratio of doubly charged to singly charged ions, the ratio of oxidised to elemental ions, and the argon oxide and argon dimer signal levels all changed. Then, with the coil fixed in relation to the sampling aperture, the torch was moved within the coil to observe whether the original analytical performance could be recovered. The torch axis was held substantially parallel to the axis of the coil, whilst the torch was moved in relation to the coil.

Surprisingly it was found that offsets of the coil with respect to the sampling aperture of up to 1 mm could be made and motion of the torch within the coil would substantially completely recover the performance. No changes to the RF power were required.

Figure 3:
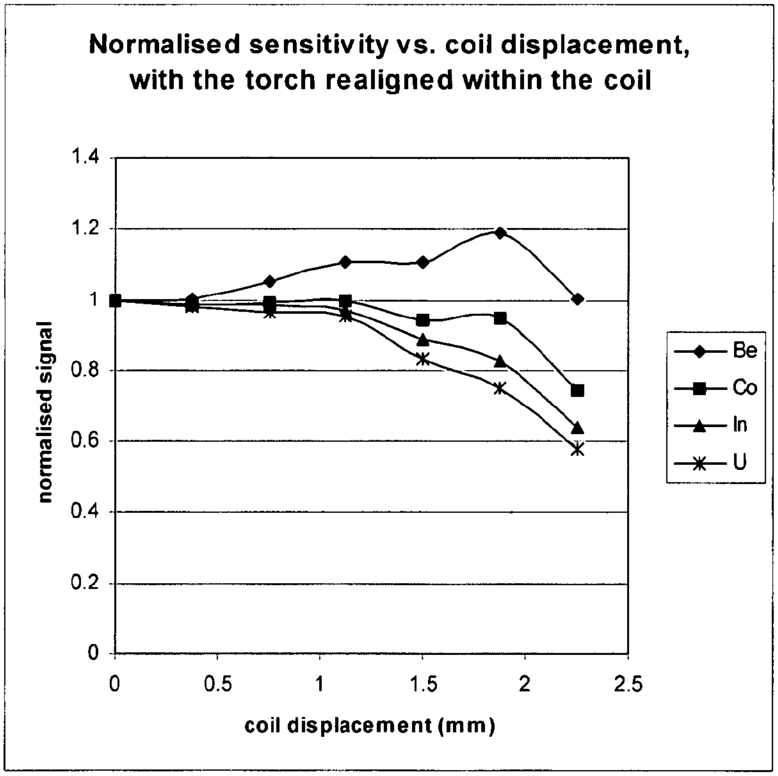
FIG. 3 shows equivalent data to that in FIG. 2, but the torch has been re-adjusted in position within the coil to compensate for the misalignment.
Figure 4:
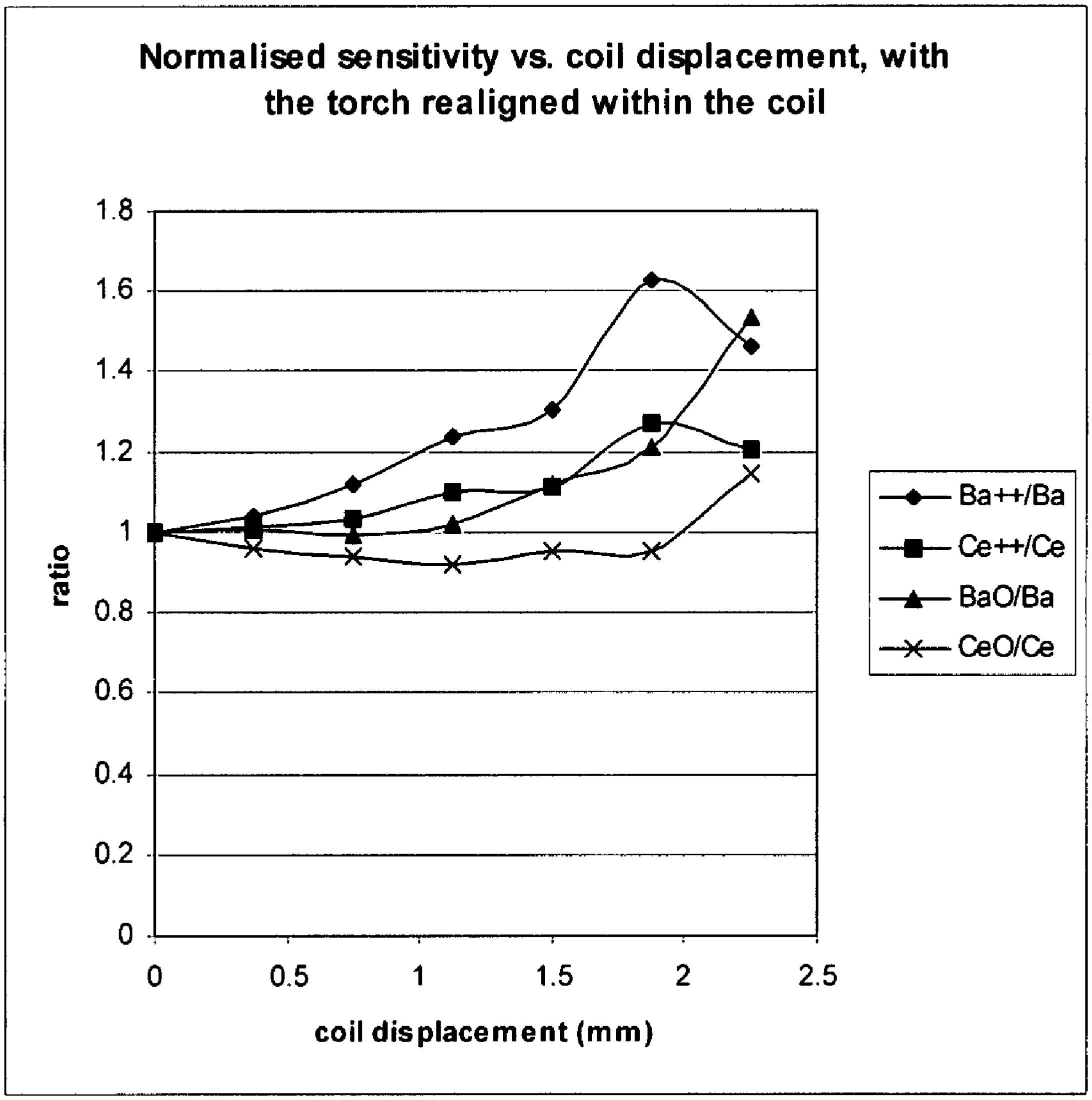
FIG. 4 is a graph of the ratios of doubly charged species and oxide species measured by ICP-MS under the same conditions as in FIG. 3.

For example, FIG. 3 shows the variation in a range of analyte sensitivities as a function of displacement, normalised to the sensitivity with no displacement. FIG. 4 shows the variation in the ratio of doubly charged species to singly charged, and the ratio of oxide species to elemental ions, for two test analytes, again normalised. In both these graphs, the displacement in mm is plotted on the x-axis, and this relates to the distance the coil and torch were together moved with respect to the sampling aperture. The torch was then moved back within the fixed coil to recover a range of performance targets. Not all performance targets were met exactly and a compromise was chosen. Performance variations within +/−10% for the analyte sensitivities across the elemental mass range are shown at the 1 mm displacement in FIG. 3. Under those conditions, the variation in the ratios of the doubly charged species and the oxide species with respect to the relevant analyte ion remain within −10% to +20%, as shown in FIG. 4. These are acceptable, and surprisingly small given the size of the displacement. A 1 mm displacement without torch readjustment within the coil reduces the signal of typical analytes by up to 85%, as shown in FIG. 2.

In a related experiment it was also discovered that the torch could be moved within the fixed coil by changing the angle of the axis of the torch in relation to the angle of the axis of the coil, pivoting the torch about a point near to the coil, and a similar recovery of performance was achieved.

Hence it has been found that the analyte-rich zone of the plasma can be aligned with the orifice of the sample cone without moving the coil in relation to the sampling aperture. One method is to displace the torch, substantially in orthogonal directions to the axis of the coil, as was employed in the analytical tests related above. Another method is to pivot the torch about a point near to the central position of the coil, and substantially on the axis of the coil. Clearly, a combination of the motions of both these methods will also provide similar advantages. To allow these methods to be performed, the internal diameter of the coil was increased slightly so as to accommodate the motion of the torch.

Figure 5:
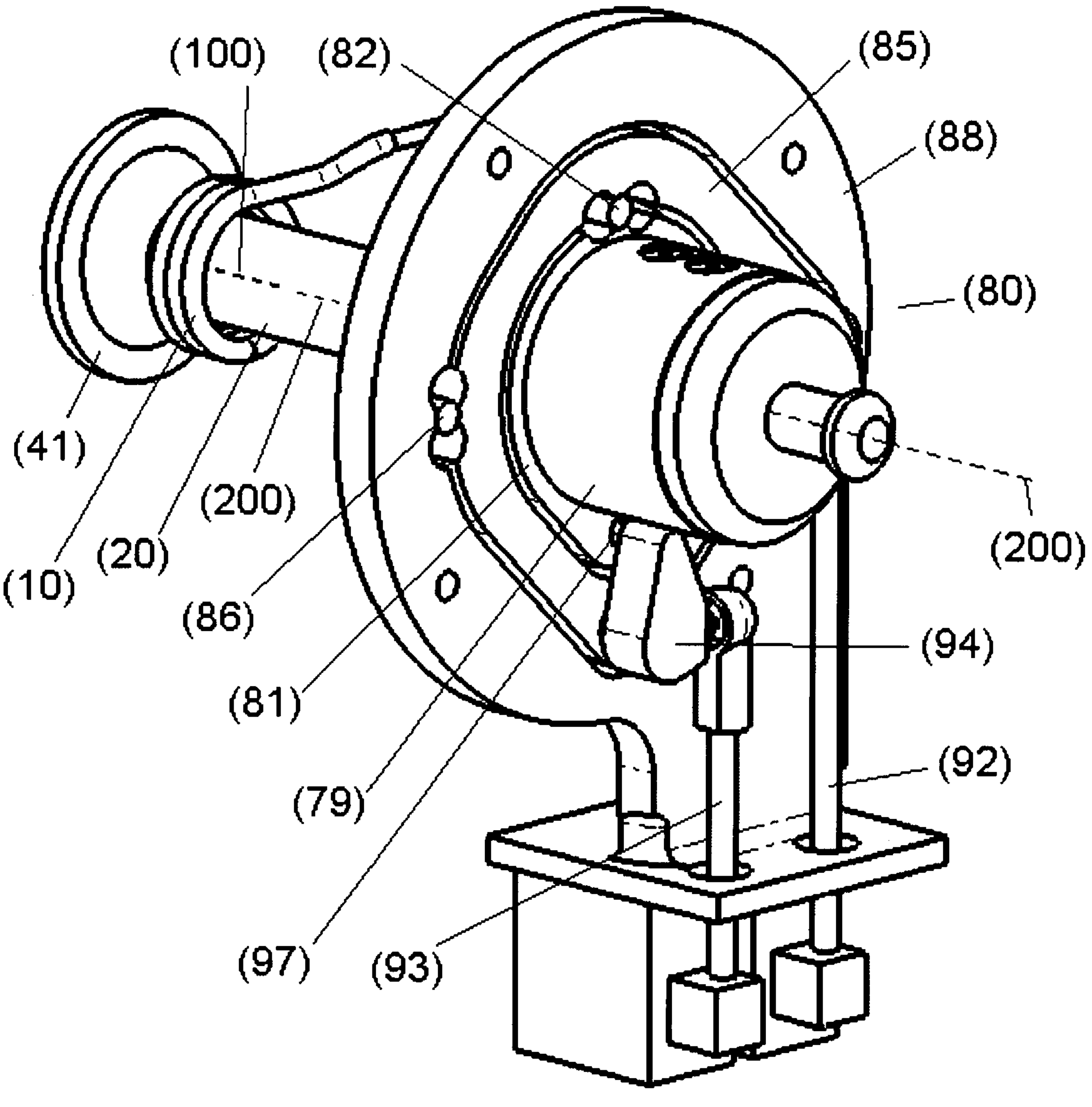
FIGS. 5 and 6 show an isometric view and an end view respectively of one embodiment of the torch adjustment mechanism of the present invention.
Figure 6:
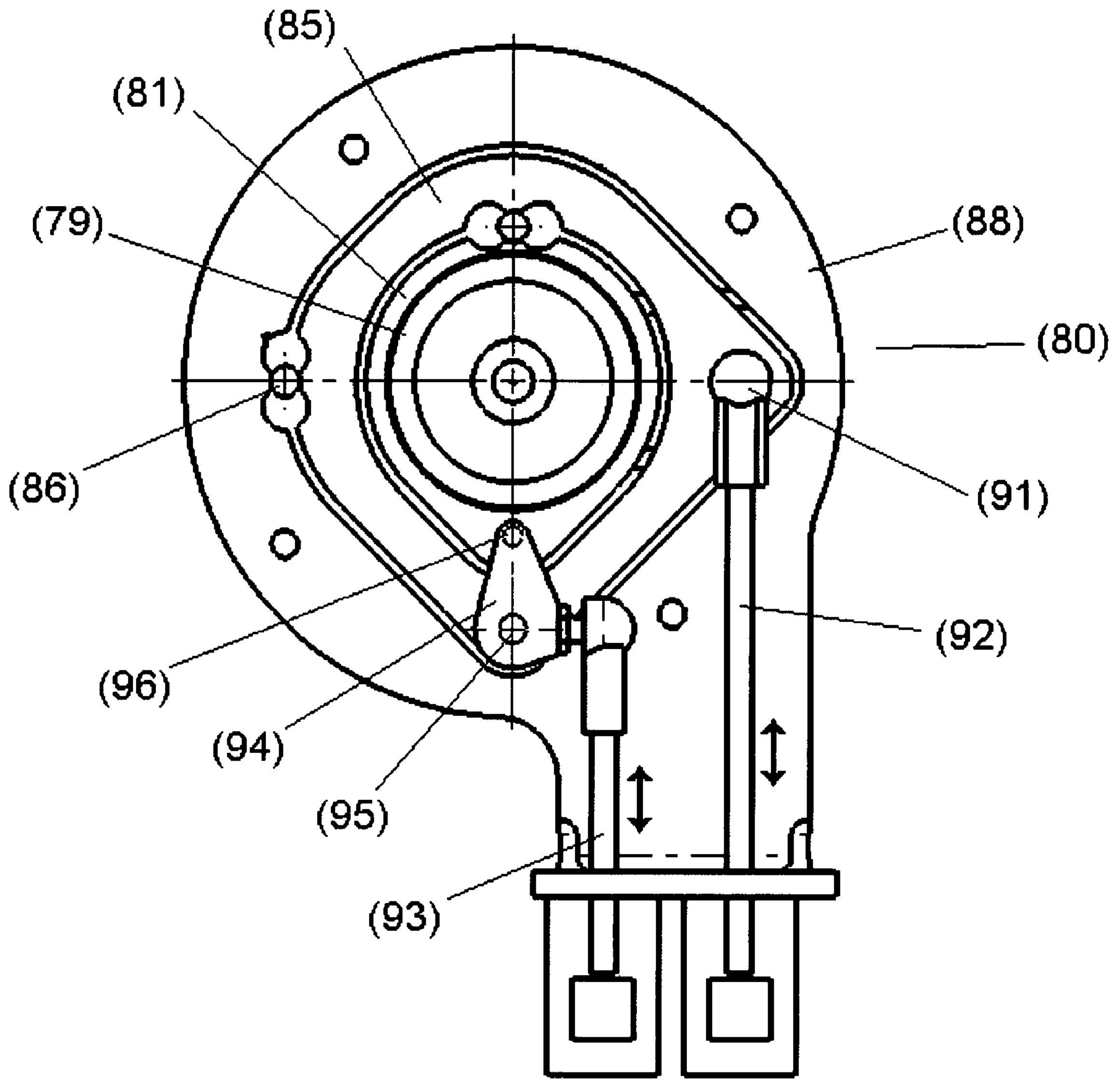

By way of example only, FIGS. 5 and 6 show one embodiment of a torch adjustment mechanism (80) of the present invention. In this embodiment, the torch axis (200) is held substantially parallel to the axis of the coil (100), and is moved in approximately orthogonal directions to the axis of the coil. The torch axis (200) is the geometrical longitudinal axis about which the various tubes that make up the torch are aligned during its manufacture. The axis of the coil (100) is the geometrical axis about which the coil is wound.

The coil (10) and the sampling plate (41) are both attached via members that are not shown, to a fixed mounting plate (88). The ICP torch (20) is secured to a torch sheath (79). The sheath (79) is attached to an inner torch mounting plate (81). The inner torch mounting plate (81) is attached to an outer torch mounting plate (85) by an inner pivot (82). The outer torch mounting plate (85) is attached to the fixed mounting plate (88) by an outer pivot (86). A ball joint (91) connects a first push rod (92) to the outer torch mounting plate (85). A second push rod (93) is connected to a bell crank (94). Close to one of its ends, the bell crank (94) is connected to the outer torch mounting plate (85), via a crank pivot (95). Close to the other end of the bell crank (94), the crank has a crank pin (96) (shown in FIG. 6), which passes through a slot cut into the inner torch mounting plate at (97) (shown in FIG. 5). The slot is shown as (98) in FIG. 7 where only plates (81), (85) and (88) of the embodiment are shown.

The torch sheath (79) is interposed between the torch (20) and the inner torch mounting plate (81). This enables the torch (20), which is usually made of glass, to be held securely without risk of breakage. Preferably the torch (20) is able to move within the coil (10) some +/−1.0 mm and the inner radius of the coil is enlarged from conventional dimensions to accommodate this motion.

The outer torch mounting plate (85) is moved by the linear action of the first push rod (92) in the direction shown by the arrow adjacent to the rod in FIG. 6. As the inner torch mounting plate (81) is connected to the outer torch mounting plate (85), motion of the outer torch mounting plate about the outer pivot (86) also moves the inner torch mounting plate (81), and the torch (20). Such motion would be restricted if the second push rod (93) did not also move at the same time. To enable the motion, as the first push rod (92) is actuated, the second push rod (93) is also actuated and controlled so that it moves approximately half the distance of that of the first push rod. This then makes the motion of the inner torch mounting plate (81) substantially independent of the motion of the outer torch mounting plate (85) about the outer pivot (86). Motion of the second push rod (93) only, in a direction indicated by the arrow adjacent to that rod in FIG. 6, causes the bell crank (94) to rotate about the crank pivot (95). The crank pin (96) then acts upon the inner torch mounting plate (81) and rotates that plate about the inner pivot (82) producing a motion substantially orthogonal to motion about the outer pivot (86).

By these means, closely orthogonal and substantially independent motions of the torch are produced within the coil. In this embodiment the coil (10) is held stationary with respect to the fixed mounting plate (88) and the sampling plate (41) (although this is not a requirement of the invention). The motion of the torch (20) with respect to that fixed mounting plate (88) causes the torch to move within the coil (10). This embodiment moves only the mass of the torch and part of the adjustment mechanism (80). The relatively bulky and heavy electronics are not moved, allowing a simpler and lower-cost alignment mechanism to be used. In this embodiment, the electronics are fixed with respect to the sampling aperture, though again this is not a requirement of the invention, and the electronics can be firmly connected to the sampling aperture and earthed, reducing RF emissions. In this embodiment the coil does not move with respect to the electronics and can be connected securely to the output of those electronics, reducing the range of adjustment needed for impedance matching. The torch adjustment mechanism, being light and moving as it does only the relatively light torch, can be oriented so as to avoid contact with acidic solutions that may result from sample spillages, and so as to be easily accessible for maintenance.

The motions of push rods (92) and (93) may be controlled by a variety of means well known to mechanical designers, for example linear actuators controlled by a microprocessor. Advantageously, this embodiment has both push rods close together and acting in the same direction, even though they cause motion of the torch in orthogonal directions. This is advantageous for the attachment of linear actuators.

The inner and outer pivots (82) and (86) can be constructed from mechanical parts in common use. They may also be made from cross-flexures (101) and (102) respectively as shown in the example in FIG. 7. This enables the inner and outer torch mounting plates, and the fixed mounting plate, to be cut from one sheet of material in one operation, avoiding waste, reducing the number of parts, and reducing the time to machine the parts and to assemble them. Typical dimensions for a cross-flexure for use in this present invention are a length of 6 mm and a thickness of 0.6 mm, when the material of the plates and flexures is ~6 mm thick aluminium.

With such cross-flexures, out of plane motion must be controlled. Out of plane motion is motion such that one or both of the plates (81) and (85) move due to a force acting substantially along the axis of the torch. The cross-flexures only relatively weakly oppose such motions. Such motions can be prevented from occurring by a range of methods, including the provision of another plate placed adjacent to the plates (81), (85) and (88).

In use, the plasma alignment apparatus described above is operated during the set-up procedure for ICP-MS or ICP-OES instrumentation, and might also be operated between analysis sessions. Initially, alignment of the torch with the sampling aperture to +/−1 mm is all that is required to obtain a detectable signal of one or more analytes from a test solution. When an instrument is first built, alignment to this accuracy is easily achieved using simple jigs and alignment tools and alignment to this tolerance level is then set for each instrument from then on. During use, changing the torch affects the plasma alignment, for example, but not such as to make it impossible to detect a signal (unless that torch has been incorrectly made).

Having a detectable signal, the alignment mechanism is adjusted whilst monitoring the change in that signal level, and the maximum signal found for an analyte element. Additional species are then chosen for detection, including a range of analytes from the sample across the mass range (for ICP-MS) or across the wavelength range (for ICP-OES), species that enable the ratio of doubly charged species to singly charged to be measured, and the ratio of oxide species to elemental ions to be measured, for example. The alignment mechanism is adjusted to obtain the best performance depending on the sample analysis which is to be performed. For example, it is sometimes found that a higher analyte signal level of some species may be obtained, but at the expense of having a larger proportion of doubly charged species. This might not be a severe penalty for the analysis of some samples, indeed overall it could be beneficial, and the operator might decide to deliberately tune the instrument to produce this effect. Doing so typically involves adjustment of the plasma alignment, and also the gas flows into the torch. It is often found that altering gas flows affects the plasma such that a further process of realignment of the torch with the sampling aperture is required. When changing to different samples, the operator might retune the instrument to optimise its performance in a different way, and again the plasma alignment will often be adjusted.

Alignment of the plasma using the methods and apparatus described in this invention is simple and can be automated. The signal levels for analyte species known to be present within a test solution may be monitored and the alignment system adjusted to achieve a desired set of performance characteristics using processes under electronic or computer control. The plasma alignment may also be automatically switched into different positions for the analysis of different samples. A control system having hardware or software suitable for automatically controlling the analyte signal maximisation, or optimisation, process can therefore be provided and form part of the ICP spectrometer. Depending on the analyte(s) of interest, the control system may be arranged either to maximise a detected analyte signal received from an associated mass or optical emission spectrometer 110, or to optimise that signal based on a number of factors.

Figure 8:
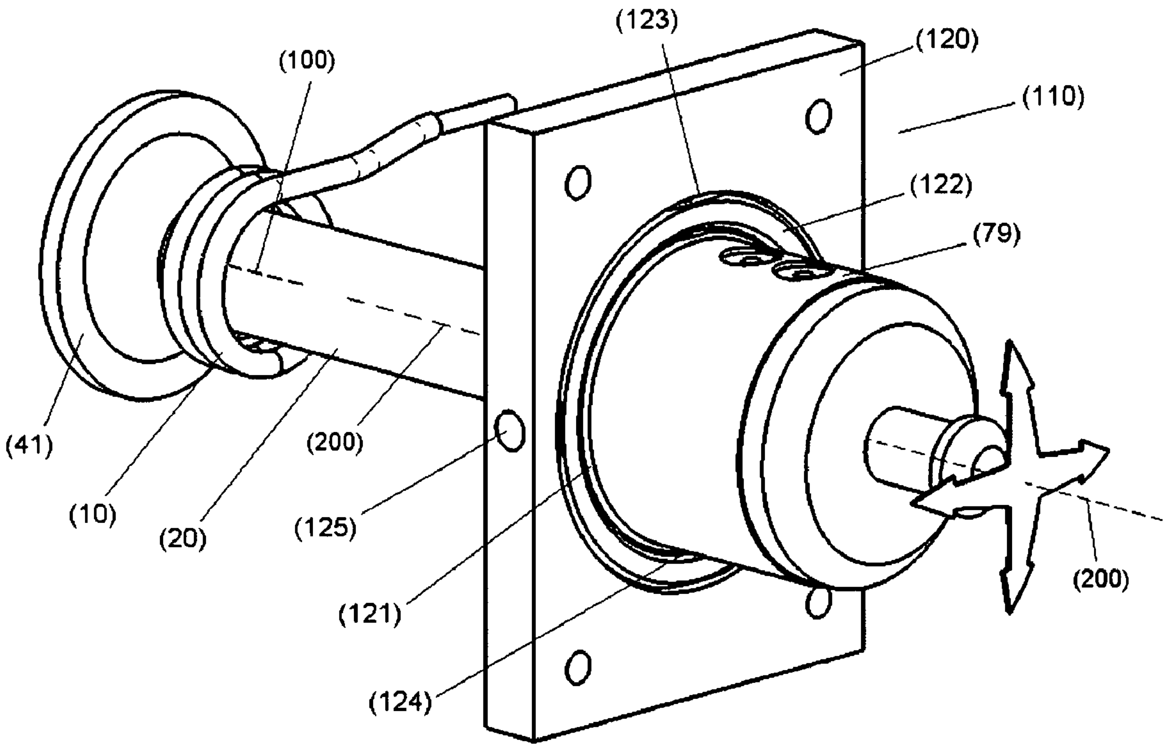
FIG. 8 shows an isometric view of a further embodiment of the present invention, in which the angle of the axis of the torch is adjustable with respect to the angle of the axis of the coil.

FIG. 8 shows another embodiment of the torch alignment mechanism (110), in which the angle of the axis (200) of the torch is adjusted in relation to the axis (100) of the coil. Again the sampling plate (41), the coil (10) and a fixed mounting plate (120) are connected together with members that are not shown. The torch (20) is held within a torch sheath (79). The torch sheath (79) is secured to an inner gimbal ring (121). The inner gimbal ring (121) is supported within an outer gimbal ring (122) via a pair of inner pivots, one of which is shown in FIG. 8 as (123). The other inner pivot is located diametrically opposite the first at location (124). Similarly the outer gimbal ring (122) is supported in the fixed mounting plate (120) via a pair of outer pivots, one of which is shown as (125), the other being diametrically opposite the first and hidden from view by the torch sheath (79). A straight line passing between the two inner pivots is preferably orthogonal to a straight line passing between the two outer pivots, so that the angular adjustment of the torch using the gimbals is independent in the two directions.

The angle of the axis (200) of the torch is adjusted in relation to the angle of the axis (100) of the coil by the rotations about the inner and outer pivots.

Figure 9:
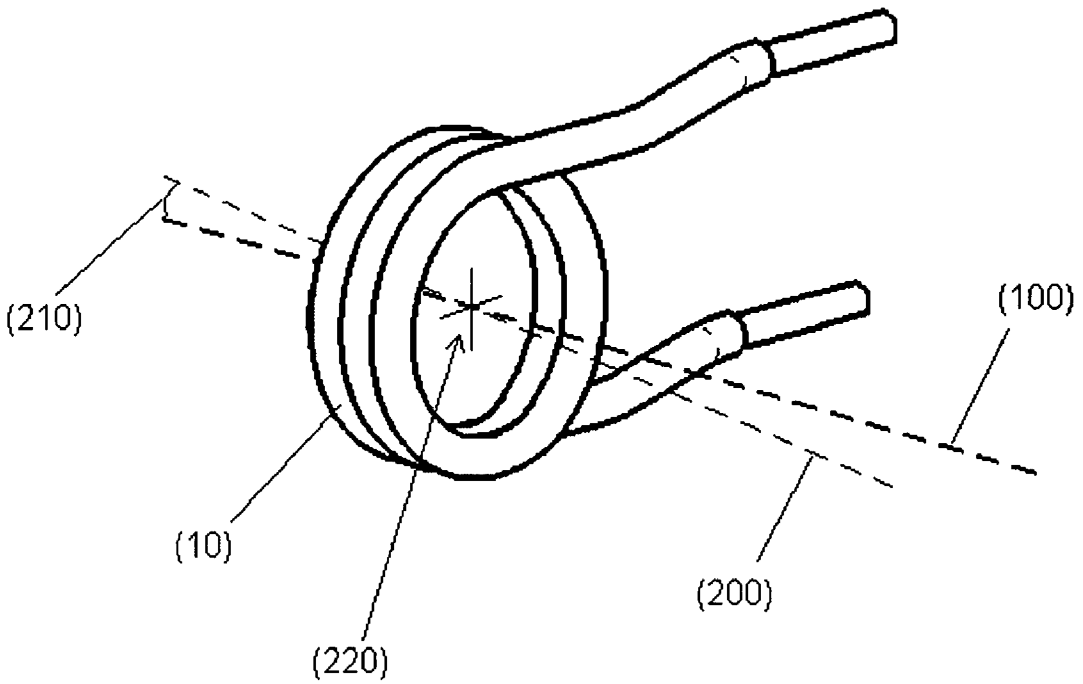
FIGS. 9 and 10 show a coil, and torch and coil axes when plasma alignment is made by adjustment of the angle of the axis of the torch with respect to the angle of the axis of the coil.

The position of the pivots in relation to the center of the coil affects how this embodiment works. FIG. 9 shows a coil (10) having a coil axis (100). The torch (not shown for clarity) has a torch axis (200) and is pivoted using a pivot system, which is located in a plane as indicated by a cross at location (220) of FIG. 9, in the center of the coil (10). Adjusting the angle of the axis (200) of the torch in relation to the angle of the axis (100) of the coil in the case shown in FIG. 9 causes an angle change (210).

Figure 10:
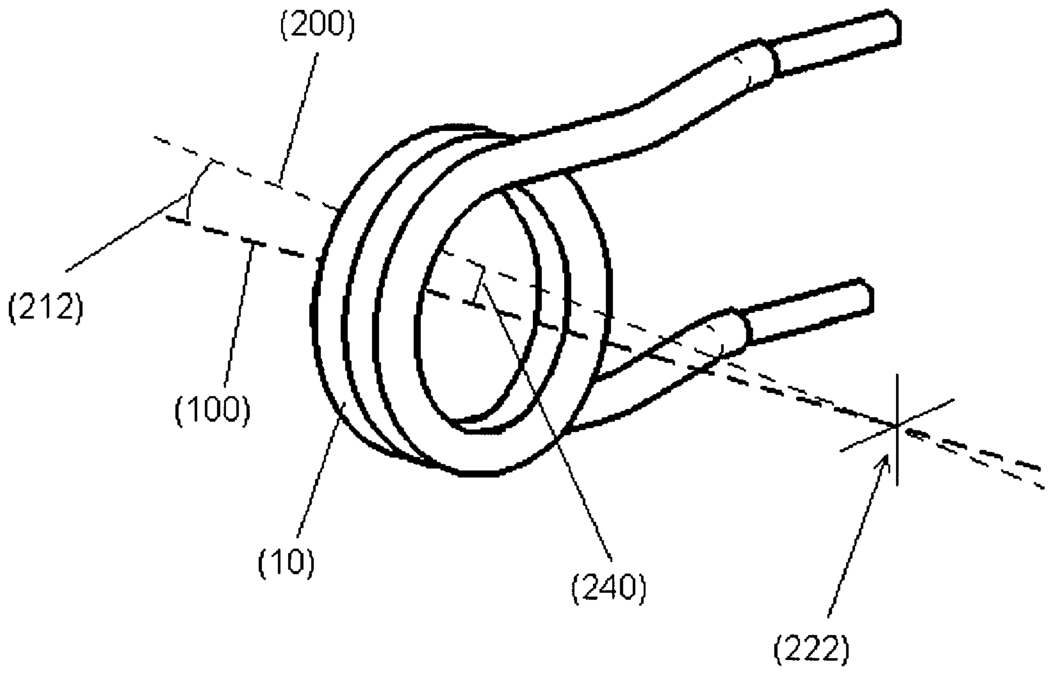

Alternatively, FIG. 10 shows a coil (10) having a coil axis (100). The torch (not shown for clarity) has a torch axis (200) and is pivoted using a pivot system, which is located in a plane as indicated by a cross at location (222) of FIG. 10, remote from the coil. In this case, adjusting the angle of the axis of the torch in relation to the angle of the axis of the coil causes an angle change (212) and also a displacement (240) of the torch within the coil. The situation depicted in FIG. 10 corresponds to that shown in FIG. 8 where the pivots are likewise remote from the coil. When adjusting the angle of the torch axis (200), it is advantageous to position the torch alignment mechanism (110) (shown in FIG. 8) close to the coil (10), as this reduces the displacement (240) (shown in FIG. 10) of the torch (20) within the coil (10) when the angle adjustment is made. However, if the torch adjustment mechanism (110) is positioned remote from the coil (10) as is shown in FIG. 8, a combination of axis angle change and displacement of the torch within the coil occurs as angle adjustment is made. Desired plasma adjustment may be made with either of these embodiments.

In use, these embodiments of the invention are operated in a similar manner to that described earlier. That is, the ICP-MS or ICP-OES instrument has an initial alignment between the torch and the sampling aperture; the alignment mechanism (110) then adjusts the alignment—by changing the angle and/or the distance/separation between the torch and coil axes (200, 100)—while the detected signal level at the analyser is monitored; this procedure continues until a maximum signal level, or other desired signal level, for the intended application is found (this procedure can be manually or automatically performed). To the operator, as the instrument is set up and tuned for performance, the two embodiments will not appear significantly different.

In the embodiment of FIG. 8, as the coil (10), sampling plate (41) and fixed mounting plate (120) are held stationary with respect to each other, they may be firmly connected electrically and a sound earth path created, thereby reducing RF emissions. The adjustment mechanism (110) only moves a relatively small and light component (the torch) and can therefore be manufactured at lower cost than was possible with prior art systems, in which the electronics were also moved when aligning the plasma. The coil is fixed in relation to the electronics, reducing the range of adjustment required for impedance matching. Again, the torch alignment mechanism (110), being small and light, can be oriented to avoid contact with acidic solutions if a spillage occurs, and to be accessible for maintenance.

Figure 7:
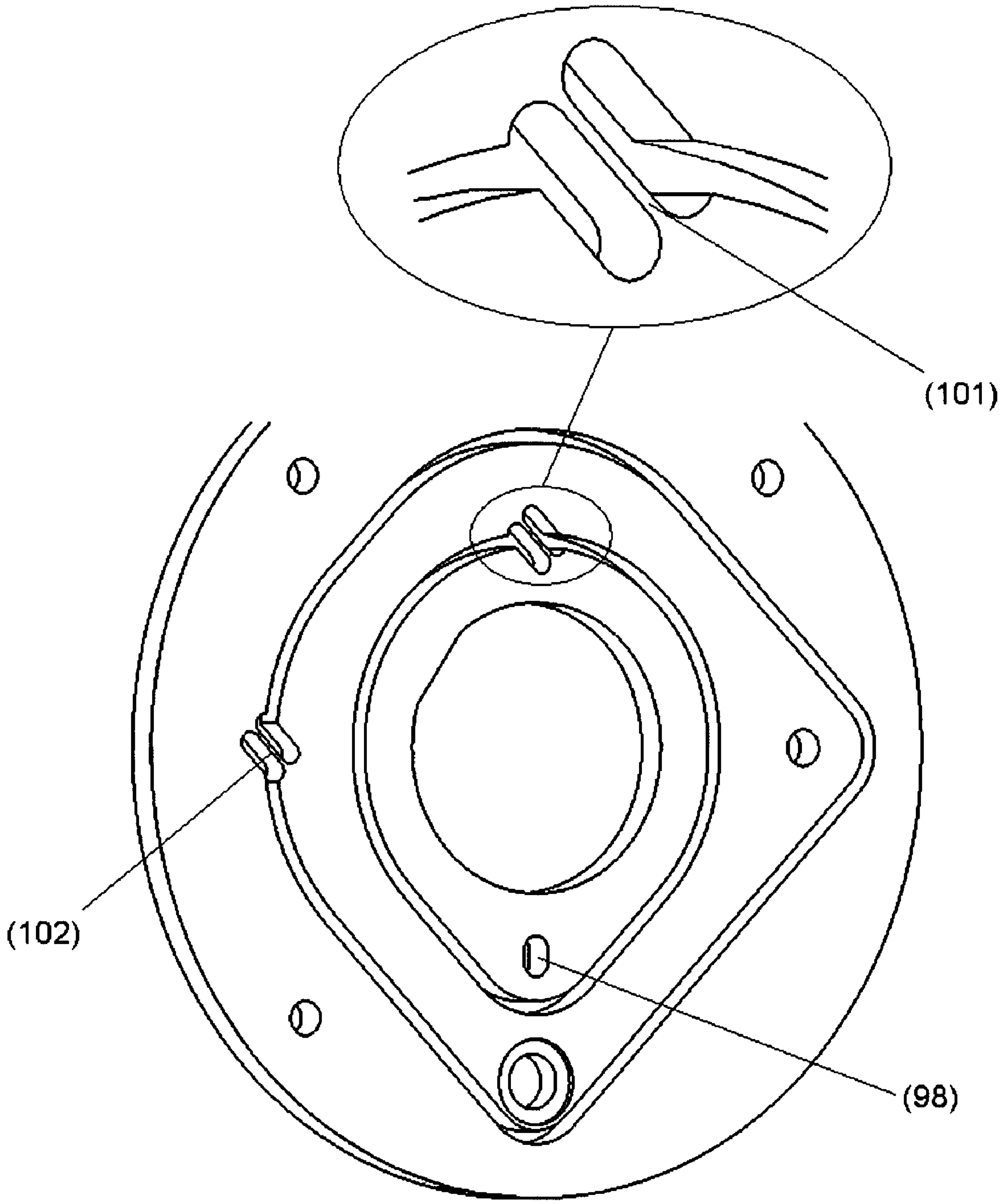
FIG. 7 shows an isometric view of part of one embodiment of the torch adjustment mechanism of the invention, with cross-flexure pivots.

Whilst pivots have been described as in FIGS. 5, 6 and 7, a stage system could also be used to effect displacements of the torch within the coil, in which truly linear motions are created, rather than rotations about pivots. There is a range of mechanical adjustment systems commonly available and known to mechanical designers, which could be used for this purpose, or for adjusting the angle of the axis of the torch in relation to the angle of the axis of the coil.

Mechanisms which adjust the separation between the torch axis (200) and the coil axis (100), and mechanisms which adjust the angle between the torch and coil axes (200, 100) with the location of the pivot being either at or relatively remote from the coil (10), have been described. However, for some applications, it may be beneficial to provide a combination of these effects. Thus a single adjustment mechanism which is capable of adjusting both the angle and the separation between the torch and coil axes (200, 100)—by comprising a rotation mechanism and also a translation mechanism—may be provided. Preferably, such a mechanism would also be capable of being controlled to adjust the separation and angle independently, as well as jointly, so that it may be used in a number of applications.

The above mechanisms and their use also fall within the scope of this invention.

The foregoing description, for purpose of explanation, has been described with reference to specific embodiments. However, the illustrative discussions above are not intended to be exhaustive or to limit the invention to the precise forms disclosed. Many other embodiments, modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An inductively coupled plasma alignment apparatus comprising:

a coil for generating an inductively coupled plasma in a gas, the coil having a first axis;

a torch passing at least partially through the coil, the torch having a second axis; and an adjustment mechanism that adjusts the position of the torch translationally in a direction having a transverse component relative to the first axis, or angularly relative to the first axis.

2. The alignment apparatus of claim 1 wherein the adjustment mechanism is arranged to adjust a distance between the second axis and the first axis.

3. The alignment apparatus of claim 1 wherein the second axis is held substantially parallel to the first axis, and the adjustment mechanism is arranged to adjust a distance between the second axis and the first axis.

4. The alignment apparatus of claim 1 wherein the coil is maintained substantially fixed in position with respect to a sampling aperture for sampling photons or ions from the plasma.

5. The alignment apparatus of claim 4 wherein the adjustment mechanism is arranged to adjust an angle between the second axis and the first axis.

6. The alignment apparatus of claim 4 wherein the adjustment mechanism is arranged to adjust a distance between the second axis and the first axis.

7. The alignment apparatus of claim 4 wherein the second axis is held substantially parallel to the first axis, and the adjustment mechanism is arranged to adjust a distance between the second axis and the first axis.

8. The alignment apparatus of claim 1 wherein the first axis extends longitudinally through the coil.

9. The alignment apparatus of claim 1 wherein the second axis extends longitudinally through the torch.

10. The alignment apparatus of claim 1, further comprising a control system for automatically controlling the adjustment mechanism based on an analyte signal detected by an associated spectrometer.

11. An inductively coupled plasma alignment apparatus comprising:

a coil for generating an inductively coupled plasma in a gas, the coil having a first axis;

a torch passing at least partially through the coil, the torch having a second axis; and an adjustment mechanism for adjusting the position of the torch with respect to the coil so as to alter the relative configuration of the first and second axes;

wherein the adjustment mechanism is arranged to adjust an angle between the second axis and the first axis.

12. A method of aligning an inductively coupled plasma to a sampling aperture, comprising steps of:

providing a torch and a plasma generating coil surrounding at least a portion of the torch; and adjusting a position of the torch translationally in a direction having a transverse component relative to an axis of the plasma generating coil, or angularly relative to the axis of the plasma generating coil.

13. A method of aligning an inductively coupled plasma to a sampling aperture as in claim 12, wherein an angle between an axis of the torch and the axis of the coil is adjusted.

14. A method of aligning an inductively coupled plasma to a sampling aperture as in claim 12, wherein a separation between an axis of the torch and the axis of the coil is adjusted.

15. A method of aligning an inductively coupled plasma to a sampling aperture as in claim 12 wherein an axis of the torch is maintained substantially parallel to the axis of the coil whilst the axis of the torch is moved with respect to the axis of the coil.

16. A method of aligning an inductively coupled plasma to a sampling aperture as in claim 12 wherein the coil is held stationary with respect to the sampling aperture and the torch is moved within the coil.

17. A method of aligning an inductively coupled plasma to a sampling aperture as in claim 16, wherein an angle between an axis of the torch and the axis of the coil is adjusted.

18. A method of aligning an inductively coupled plasma to a sampling aperture as in claim 16, wherein a separation between an axis of the torch and the axis of the coil is adjusted.

19. A method of aligning an inductively coupled plasma to a sampling aperture as in claim 16 further comprising a step of automatically adjusting the position of the torch based on an analyte signal detected by an associated spectrometer.

20. A method of aligning an inductively coupled plasma to a sampling aperture as in claim 12 further comprising a step of automatically adjusting the position of the torch based on an analyte signal detected by an associated spectrometer.

21. A method of aligning an inductively coupled plasma to a sampling aperture as in claim 20 where in the position of the torch is adjusted automatically so as to maximise the analyte signal.

22. A method of aligning an inductively coupled plasma to a sampling aperture as in claim 20, wherein the step of automatically adjusting the position based on the analyte signal is performed under computer control.

* * * * *